(12) United States Patent
Fuchs et al.

(10) Patent No.: US 11,535,247 B2
(45) Date of Patent: Dec. 27, 2022

(54) METHOD AND DEVICE FOR A COOPERATIVE COORDINATION BETWEEN FUTURE DRIVING MANEUVERS OF ONE VEHICLE AND THE MANEUVERS OF AT LEAST ONE OTHER VEHICLE

(71) Applicants: ROBERT BOSCH GMBH, Stuttgart (DE); Continental Automotive Technologies GmbH, Hannover (DE)

(72) Inventors: Hendrik Fuchs, Hildesheim (DE); Florian Wildschütte, Hildesheim (DE); Thomas Michalke, Weil der Stadt (DE); Ignacio Llatser Marti, Hildesheim (DE); Maxim Dolgov, Renningen (DE); Sebastian Strunck, Niedernhausen (DE); Jonas Schönichen, Weiterstadt (DE); Thomas Grotendorst, Eschborn (DE)

(73) Assignees: Robert Bosch GMBH, Stuggart (DE); Continental Automotive Technologies GMBH, Hannover (DE)

( * ) Notice: Subject to any disclaimer, the term of this patent is extended or adjusted under 35 U.S.C. 154(b) by 213 days.

(21) Appl. No.: 17/046,776

(22) PCT Filed: Apr. 18, 2019

(86) PCT No.: PCT/DE2019/100367
§ 371 (c)(1),
(2) Date: Oct. 10, 2020

(87) PCT Pub. No.: WO2019/206377
PCT Pub. Date: Oct. 31, 2019

(65) Prior Publication Data
US 2021/0146922 A1    May 20, 2021

(30) Foreign Application Priority Data
Apr. 24, 2018 (DE) .......................... 102018109883.9

(51) Int. Cl.
*B60W 30/09* (2012.01)
*H04W 4/46* (2018.01)
(Continued)

(52) U.S. Cl.
CPC .... *B60W 30/0956* (2013.01); *B60W 30/0953* (2013.01); *G06K 9/6267* (2013.01);
(Continued)

(58) Field of Classification Search
CPC . B60W 2554/4045; B60W 2554/4049; B60W 2556/65; B60W 30/095;
(Continued)

(56) References Cited

U.S. PATENT DOCUMENTS 9,669,828 B2 * 6/2017 Caveney ................ G08G 1/161
9,914,453 B2 * 3/2018 Kraehling ......... B60W 30/0953
(Continued)

FOREIGN PATENT DOCUMENTS

DE       102007058538 A1    6/2009
DE    10 2012 009 555 A1   11/2012
(Continued)

OTHER PUBLICATIONS

International Search Report and Written Opinion—PCT/DE2019/100367—ISA/EPO —dated Jul. 2, 2019, 7 pages.
(Continued)

*Primary Examiner* — Tyler J Lee
(74) *Attorney, Agent, or Firm* — The Marbury Law Group, PLLC (57) ABSTRACT

The present invention relates to a method of cooperatively coordinating future driving maneuvers of a vehicle with fellow maneuvers of at least one fellow vehicle, wherein trajectories for the vehicle are rated with an effort value each, trajectories and fellow trajectories of the fellow vehicle are combined into tuples, the trajectory and the
(Continued)

associated effort value of a collision-free tuple are selected as reference trajectory and reference effort value, trajectories with a lower effort value than the reference effort value are classified as demand trajectories, trajectories with higher effort value than the reference effort value are classified as alternative trajectories, and a data packet having a trajectory set consisting of the reference trajectory and the associated reference effort value as well as at least one trajectory from a group comprising the demand trajectories and the alternative trajectories as well as the respective effort values is transmitted to the fellow vehicle.

13 Claims, 4 Drawing Sheets (51) Int. Cl.
*B60W 30/00* (2006.01)
*G06K 9/62* (2022.01)
*B60W 30/095* (2012.01)

(52) U.S. Cl.
CPC ...... *H04W 4/46* (2018.02); *B60W 2554/4045* (2020.02); *B60W 2554/4049* (2020.02)

(58) Field of Classification Search
CPC ......... B60W 30/0953; B60W 30/0956; B60W 60/0011; B60W 60/0015; B60W 60/00274; G06K 9/6267; G08G 1/096716; G08G 1/096725; G08G 1/096758; G08G 1/096791; G08G 1/163; H04W 4/46
See application file for complete search history.

(56) References Cited

U.S. PATENT DOCUMENTS

| | | | | |
|---|---|---|---|---|
| 2011/0227757 | A1* | 9/2011 | Chen | G08G 1/096791 340/902 |
| 2013/0218365 | A1* | 8/2013 | Caveney | G05D 1/0295 701/1 |
| 2013/0325306 | A1 | 12/2013 | Caveney et al. | |
| 2017/0236421 | A1* | 8/2017 | Yang | B60W 30/095 701/301 |
| 2018/0257645 | A1* | 9/2018 | Buburuzan | B60W 30/08 |
| 2018/0257647 | A1* | 9/2018 | Jurca | G01S 13/931 |

FOREIGN PATENT DOCUMENTS

| | | |
|---|---|---|
| DE | 102012009555 A1 | 11/2012 |
| DE | 102012011994 A1 | 12/2013 |
| DE | 102014211507 A1 | 12/2015 |
| DE | 10 2015 220 481 A1 | 5/2017 |
| DE | 102015220481 A1 | 5/2017 |
| DE | 102015221817 A1 | 5/2017 |
| DE | 102016209330 A1 | 11/2017 |
| JP | 2008-305014 A | 12/2008 |
| JP | 2010-287109 A | 12/2010 |
| KR | 10-2021-0023765 A | 3/2021 |
| WO | 2011/009009 A1 | 1/2011 |

OTHER PUBLICATIONS

Intelligent Maneuver Automation—Cooperative Hazard Avoidance in Real-Time, Feb. 22, 2018, 5 pages retrieved from: https://imagine-online.de/home/.
Werling et al., "Optimal trajectories for time-critical street scenarios using discretized terminal manifolds", The International Journal of Robotics Research, Mar. 2012, DOI: 10.1177/0278364911423042, 15 pages.
Düring et al., "Adaptive Cooperative Maneuver Planning Algorithm for Conflict Resolution in Diverse Traffic Situations", International Conference on Connected Vehicles and Expo (ICCVE), 2014, 8 pages.
Notice of Allowance received in corresponding patent application Korean Application No. 9-5-2022-069047310 dated Sep. 13, 2022.

* cited by examiner

METHOD AND DEVICE FOR A COOPERATIVE COORDINATION BETWEEN FUTURE DRIVING MANEUVERS OF ONE VEHICLE AND THE MANEUVERS OF AT LEAST ONE OTHER VEHICLE

FIELD OF THE INVENTION

The invention relates to a method and a device for a cooperative coordination of future driving maneuvers of a vehicle with fellow maneuvers of at least one fellow vehicle.

BACKGROUND

Via radio, vehicles may exchange messages with one another and with infrastructure installations. For example, a vehicle may detect objects within its detection range and transmit an object message describing the detected objects. Another vehicle may thus include an object detected by the vehicle outside its own detection range in its own calculations. Also, the vehicle may provide a routing message representing its planned route to enable improved route planning for other vehicles.

DE 10 2007 058 538 A1 describes a method of controlling a hazardous situation in traffic.

DE 10 2012 011 994 A1 describes a method of supporting driver assistance and/or safety functionalities of motor vehicles.

DE 10 2015 221 817 A1 describes a method of decentralized coordination of driving maneuvers.

SUMMARY

Against this background, the approach presented here introduces a method of the cooperative coordination of future driving maneuvers of a vehicle with fellow maneuvers of at least one fellow vehicle, a corresponding device, and finally a corresponding computer program product according to the independent claims. Advantageous further developments and improvements of the approach presented here result from the description and are described in the dependent claims.

Advantages of the Invention

Embodiments of the present invention may advantageously enable future driving maneuvers of different vehicles to be coordinated in mutual agreement, so that none of the vehicles has to perform a disproportionately large steering intervention, braking intervention and/or acceleration intervention to enable flowing traffic. A method used for this purpose may be carried out using a device such as a control unit. For the execution of the method, signals, measured values or the like may be used and/or analyzed, which are provided for example by sensors, measuring instruments or similar devices. The method may be carried out fully or partially automated. Human intervention may not be excluded, but may not be necessary.

A method of the cooperative coordination of future driving maneuvers of a vehicle with fellow maneuvers of at least one fellow vehicle is presented, the method comprising the following steps:
1) Rating a trajectory set of pre-planned trajectories for the vehicle with one effort value each using at least one rating criterion;
2) Receiving a fellow data packet from the fellow vehicle, wherein the fellow data packet contains a fellow trajectory set with different pre-planned fellow trajectories for the fellow vehicle and a fellow effort value for each fellow trajectory;
3) Combining one trajectory and one fellow trajectory each into tuples and combining the respective effort value with the respective fellow effort value into a tuple effort value of the tuple;
4) Selecting collision-free tuples, wherein tuples are selected where the trajectory and the fellow trajectory are collision-free within a collision horizon;
5) Selecting the trajectory and the associated effort value of the collision-free tuple with the lowest tuple effort value as reference trajectory and reference effort value;
6) Classification of trajectories with a lower effort value than the reference effort value as demand trajectories and demand effort values;
7) Classification of trajectories with a higher effort value than the reference effort value as alternative trajectories and alternative effort values; and
8) Transmitting a data packet to the fellow vehicle, wherein the data packet contains a trajectory set of the reference trajectory and the associated reference effort value and at least one trajectory from a group comprising the demand trajectories and the alternative trajectories as well as the respective effort values.

In particular, steps (5) to (7) may be specified as follows:
5a) Selecting the collision-free tuple (210) with the lowest tuple effort value and classifying the trajectory (108) and the associated effort value (112) of this tuple (210) as reference trajectory (110) and reference effort value (114);
6a) Selecting trajectories (108) with a lower effort value (112) than the reference effort value (114) and classifying these trajectories (108) and associated effort values (112) as demand trajectories and demand effort values, wherein a demand trajectory is a trajectory indicating a wish of the vehicle, with which a desired travel destination may be reached more favorably than with the reference trajectory;
7a) Selecting trajectories (108) with a higher effort value (112) than the reference effort value (114) and classifying these trajectories (108) and associated effort values (112) as alternative trajectories and alternative effort values, wherein an alternative trajectory is a trajectory indicating an offer of cooperation by the vehicle which the vehicle would be willing to drive if applicable.

Ideas concerning embodiments of the present invention may be regarded as being based, among other things, on the thoughts and findings described below.

A driving maneuver of a vehicle may be understood as steering, braking and/or accelerating the vehicle. A drive train of the vehicle may brake the vehicle by a drag torque and accelerate it by a drive torque. A braking system of the vehicle may brake the vehicle by a braking torque. A steering system of the vehicle may steer the vehicle by a steering angle. The driving maneuvers are speed-dependent. For example, a current speed of the vehicle determines a current minimum drivable curve radius. By braking before steering, a smaller curve radius may be driven.

The vehicle may be described as an own vehicle or ego vehicle. In a device of the vehicle, the method described herein may be executed. The vehicle may be controlled at least partially by a driver. For this purpose, the driver may receive driving instructions from the device. The driving maneuvers may also be controlled at least partially by a control unit. The vehicle may also be controlled fully or partially autonomously by the control unit.

A fellow vehicle is another vehicle. The adjective "fellow" is also used in the text to distinguish other terms associated with the fellow vehicle. The fellow vehicle is steered by a fellow driver or a fellow control unit. The method presented here may also be carried out on a fellow device of the fellow vehicle. A fellow maneuver may be understood as a driving maneuver of the fellow vehicle. The approach presented here may also be executed with swapped roles, from the perspective of the fellow vehicle, whereby the terms vehicle and fellow vehicle as well as the associated features are interchanged.

A trajectory describes a condition progression (e.g. position, orientation, speed vectors and acceleration vectors, etc.) over time, over which the vehicle may be controlled using the driving maneuvers. The trajectory is multidimensional, particularly two-dimensional or three-dimensional. The trajectory may extend along a driving surface to be driven on by the vehicle, for example a road. The trajectory therefore describes where the vehicle is at what time and where it will be in the future. The trajectory is planned at least up to a prediction horizon. For example, the prediction horizon may be determined by a sensor range of the vehicle. The prediction horizon may be speed-dependent. A collision horizon may be less than or equal to the prediction horizon. The collision horizon may also be speed-dependent. Trajectories are rated as collision-free if they run from the vehicle to the collision horizon in such a way that the vehicle and the fellow vehicle each have at least a minimum distance to each other.

A trajectory set combines a group of possible trajectories, which intersect at a common point or start from a common point. The common point may be a current position of the vehicle at the current time. At the common point, the vehicle travels with identical speed and identical direction for all trajectories of a trajectory set. The trajectories of the trajectory set are all at least slightly different. At least one driving maneuver is different for all trajectories of the trajectory set. Different trajectories of the trajectory set may cross each other. Here, a future position may be reached at the same future point in time via different trajectories.

A data packet may be a self-contained message. The data packet may be called a maneuver coordination message. The data packet may be transmitted via a communication interface from the vehicle to fellow vehicles. Vice versa, the fellow vehicles may provide fellow data packets to the vehicle via the communication interface. The data packet or the fellow data packet may contain a single trajectory information of a single trajectory that is pre-planned for the vehicle. Either the vehicle or the fellow vehicle transmits trajectory information of at least two trajectories, so that at least three trajectories are available for the generation of tuples. In particular, the data packet contains trajectory information of different trajectories of a trajectory set pre-planned for the vehicle. For example, the trajectories may be mapped as a sequence of location coordinates at fixed distances from each other. The distances may be spatial or temporal. In the case of spatial distances, the location coordinates are provided with time stamps. The trajectories may also be mapped parameterized. Here, the trajectory may be described mathematically as a graph. The trajectory may be described in sections.

The data packet contains effort values for each trajectory. Due to the effort values, the trajectories are comparable without having to reconstruct a driving effort of the individual driving maneuvers for each trajectory.

The effort value describes the driving effort required to travel one of the trajectories. The driving effort may be different for different vehicles. For example, the driving effort for an agile, light vehicle may be lower than for a large, heavy vehicle on the same trajectory. Constant driving without any changes in speed and direction may be rated with a low driving effort or no driving effort at all. Strong braking may be rated with a higher driving effort than weak braking. Strong acceleration may be rated with a higher driving effort than weak acceleration. A narrow curve radius may be rated with a higher driving effort than a wide curve radius. The effort value combines the driving efforts required along the respective trajectory into a numerical value. A trajectory with extreme driving maneuvers is thus rated with a higher effort value than a trajectory with weakly developed driving maneuvers. A rating criterion may assign numerical values for the driving effort to the individual driving maneuvers. The rating criterion may be influenced by a driver of the vehicle.

A tuple consists of at least two trajectories. The trajectories of a tuple are part of different trajectory sets of different vehicles. Thus the trajectories of the tuple start from different points. The trajectories of the tuple may intersect. If the different vehicles reach the intersection of the trajectories at different times, then the tuple is considered collision free if the vehicles are at least a minimum distance apart at all times. The minimum distance may be greater in the direction of the trajectories than across the trajectories. The minimum distance may be speed-dependent. If the minimum distance is undershot, the tuple is rated as collision-prone.

The tuple effort value expresses the total driving effort of all vehicles considered in a tuple. If one or more vehicles have to perform radical driving maneuvers on the trajectories of a tuple in order to allow another vehicle to perform an optimized trajectory, the tuple effort value of the tuple will be higher than that of a tuple in which all vehicles involved perform moderate driving maneuvers.

For example, the individual effort values of the trajectories of a tuple may be added together to obtain the tuple effort value of the tuple. The effort values may also be weighted differently to determine the tuple effort value. When weighting the effort values, a willingness to cooperate of the drivers of the vehicles observed may be taken into account.

The reference trajectory may be the trajectory that is selected from the trajectory set to be actually travelled by the vehicle. The reference effort value may be used as a reference value for the other effort values. The other effort values may be normalized to the reference effort value. For example, the reference effort value may be set to a mean value of an effort value range. The trajectories with a higher driving effort than the reference trajectory may then have larger effort values than the mean value and may be denominated alternative trajectories. The trajectories with a lower driving effort than the reference trajectory may then have smaller effort values than the mean value and may be denominated demand trajectories.

A function-specific component may also be included in the tuple effort value. A function-specific component may be e.g. a comfort condition, which leads to a preference particularly for tuples with uncritical vehicle distances.

The collision horizon may be situation-dependent. For example, the collision horizon may be dependent on traffic density. In dense traffic, the collision horizon may be smaller than in light traffic. The collision horizon may also depend on a traffic situation. When the vehicle stops at a traffic light, the collision horizon may be smaller than when the vehicle is driving on a highway.

The data packet may further contain sensor data of the vehicle. The sensor data may be used to improve the assessment of a current situation, since sensor data is available from a different viewing angle than the user's own. Alternatively or in addition, the fellow data packet may also contain sensor data of the fellow vehicle. The collision horizon may be adjusted using the sensor data. By combining sensor data from several vehicles, obstacles may be easily detected, for example.

The collision-free tuples may be selected using the road traffic regulations. Tuples whose trajectory has priority (right of way) over the fellow trajectory may be selected as collision-free tuples even if the distance between them is less than the minimum distance. Tuples where the vehicle must give way to the fellow vehicle and the spatial minimum distance is undershot may be selected as collision-prone tuples. Thus, conflicts may be solved according to the road traffic regulations. Road traffic regulations may be understood as the legal regulations valid in the respective country such as the StVO in Germany.

At least one other fellow data packet may be received from another fellow vehicle. Another fellow trajectory may be added to the tuple. The tuple effort value may be supplemented with another fellow effort value. The tuples may be formed from three or more trajectories. If the own trajectory is collision-prone towards at least one of the fellow trajectories and right of way must be yielded, the tuple is not considered for the selection of the reference trajectory.

The fellow trajectory set may also have a reference trajectory of the fellow vehicle and a reference effort value of the reference trajectory. A fellow trajectory tuple may be combined from the fellow reference trajectory and one of the trajectories. The trajectory of the collision-free fellow reference tuple with the lowest tuple effort value may be selected as reference trajectory. The reference trajectory of the other vehicle may be identified in the fellow data packet as fellow reference trajectory. The fellow reference trajectory is currently used to control the fellow vehicle. The own reference trajectory may be selected under consideration of the fellow reference trajectory, especially if the fellow reference trajectory has priority over the own trajectories.

For at least one fellow trajectory a category may be received. The reference trajectory may also be selected using the category. Alternatively or additionally, a category may be transmitted for at least one of the trajectories. In the fellow vehicle, the fellow reference trajectory may be selected using the category. A category may be an additional information on a trajectory. For example, exceptional situations may be indicated by using categories. For example, a trajectory may be classified as an emergency trajectory. The emergency trajectory may be forced upon the vehicle by external constraints, for example due to a defect, an emergency or an evasive maneuver. A vehicle on an emergency trajectory may receive higher intention to cooperate from other vehicles. A trajectory may also be classified as a cooperation offer. The trajectory classified as a cooperation offer may allow a trajectory selection that is advantageous for the other vehicle. A trajectory may also be classified as a trajectory with special rights. For example, an emergency vehicle may demand the yielding of right of way from other road users.

The alternative trajectories for transmission to fellow vehicles may be selected from collision-free tuples. Alternative trajectories require more effort for the vehicle and are selected as offers for fellow vehicles or other vehicles. It is advantageous to select only those trajectories that may be advantageous for the other vehicle.

The fellow trajectory may be predicted at least up to a prediction horizon of the vehicle, if the fellow vehicle uses a shorter fellow prediction horizon for the transferred trajectories. The fellow trajectory may be extended up to the own prediction horizon under the assumption of similar frame conditions. Thus, fellow trajectories planned with too little projection may be reasonably used for collision analysis.

The fellow trajectories may be transformed to a calculation time of the trajectories. Due to a data transfer of the fellow data packet and the data packet as well as a calculation time of the method, the fellow trajectories may show a time offset towards the own trajectories. By means of the temporal transformation, collision-prone tuples and collision-free tuples may be distinguished more precisely. The safety distance may be reduced because the future position of the fellow vehicle may be determined more precisely.

The method may e.g. be implemented in software or hardware or in a mixture of software and hardware such as in a control unit.

Furthermore, the approach presented here establishes a device that is configured to perform, control or implement the steps of a variant of the method presented here in appropriate units.

The device may be an electrical device with at least one computing unit for processing signals or data, at least one memory unit for storing signals or data, and at least one interface and/or communication interface for reading in or outputting data embedded in a communication protocol. The computing unit may be, for example, a signal processor, a so-called system ASIC, a microprocessor or a microcontroller for processing sensor signals of the own and/or fellow vehicles and outputting data signals depending on the sensor signals. The memory unit may be for example a flash memory, an EPROM or a magnetic memory unit. The interface may be configured as a sensor interface for reading in the sensor signals from a sensor and/or as an actuator interface for outputting the data signals and/or control signals to an actuator. The communication interface may be configured to read in or output the data wirelessly and/or wired. The interfaces may also be software modules, which are for example present on a microcontroller next to other software modules.

What is also advantageous is a computer program product or computer program with program code, which may be stored on a machine-readable carrier or storage medium such as a semiconductor memory, a hard disk memory or an optical memory and is used to carry out, implement and/or control the steps of the method according to one of the embodiments described above, in particular if the program product or program is executed on a computer or device.

It is pointed out that some of the possible features and advantages of the invention are described herein with respect to different embodiments. A person skilled in the art will recognize that the features of the method and the device may be combined, adapted or exchanged in a suitable manner to arrive at further embodiments of the invention.

BRIEF DESCRIPTION OF THE DRAWINGS

In the following, embodiments of the invention are described with reference to the attached drawings, whereby neither the drawings nor the description are to be interpreted as restricting the invention.

The figures are merely schematic and not to scale. Identical reference signs in the figures indicate identical or similarly acting features.

When maneuvers between vehicles are coordinated to increase comfort, efficiency and safety, among other things, this may be called cooperative driving. This is facilitated by the possibility of direct vehicle-to-vehicle communication (V2V) and the increasing automation of vehicles.

In different scenarios, methods of different types of maneuver coordination between vehicles may be performed.

For example, maneuver coordination may be enabled when avoiding obstacles. Therein, the vehicles involved first transmit a number of possible evasion trajectories. A trajectory describes the position or the condition progression of the vehicle over time. It thus codes where the vehicle will be at a future point in time. Trajectories may be represented either non-parametrically, e.g. as a sequence of location points or discrete or continuous distributions over time, or parametrically as a graph dependent on time, e.g. in the form of a polynomial or a clothoid or a flow of a discrete or continuous distribution. In the process, so-called alternative trajectories are transmitted to neighboring vehicles. Subsequently, from the quantity of possible combinations of alternative trajectories, one is selected where an expected damage is minimized or avoided completely. The rating of the combinations also allows for a prioritization of the respective alternative trajectories.

The maneuver coordination may also take place in general road traffic situations. If required, vehicles may transmit information about their current driving behavior as well as their intended driving behavior in the form of a trajectory. Another vehicle checks whether it may enable the intended maneuver of the transmitting vehicle and, as the case may be, acknowledges this explicitly or implicitly by adjusting its reference trajectory so that the vehicle having transmitted its intended maneuver will be able to perform it.

DETAILED DESCRIPTION

Figure 1:
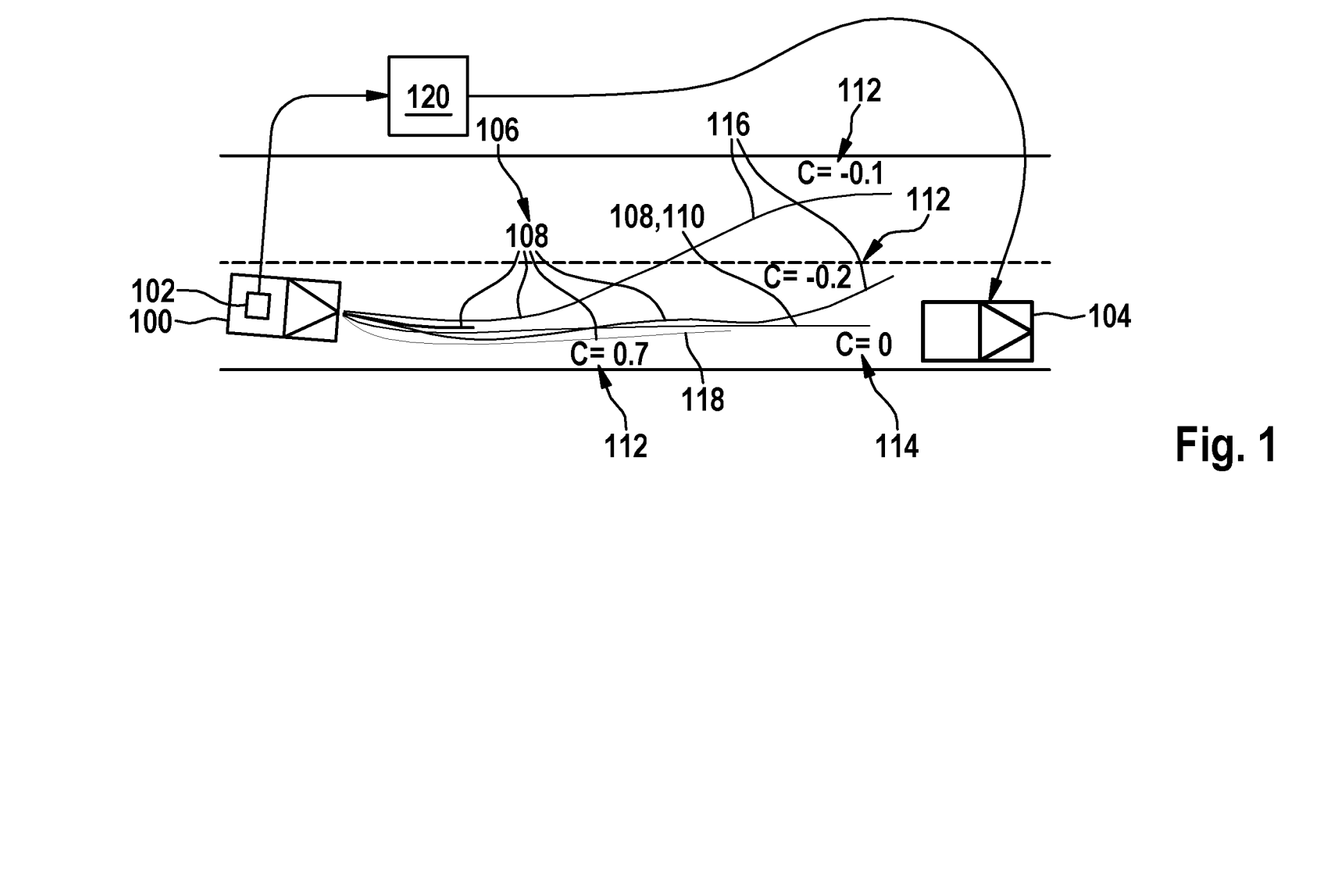
FIG. 1 shows a representation of a vehicle with a device according to an embodiment.

FIG. 1 shows a representation of a vehicle 100 with a device 102 for the cooperative coordination of future driving maneuvers of the vehicle 100 with driving maneuvers of at least one other vehicle 104. Here the vehicle 100 is driving on a road behind the other vehicle 104. The other vehicle 104 may be denominated fellow vehicle 104. Sensors of the vehicle 100 detect a current traffic situation in the vicinity of vehicle 100. Alternatively or in addition, vehicle 100 receives information about the traffic situation via radio. Depending on the traffic situation, a trajectory set 106 out of currently possible trajectories 108 is planned for vehicle 100, and one of the trajectories 108 is selected as reference trajectory 110. A trajectory 108 describes a pre-calculated course of location coordinates at which the vehicle 100 would be in the future if it travelled along this trajectory 108 using driving maneuvers such as steering, braking or accelerating. The reference trajectory 110 is actually selected to be driven.

The trajectories 108 all have the same origin. The origin here is at a current position of the vehicle 100. The trajectory set 106 is planned with reference to a prediction horizon. The prediction horizon indicates at which location coordinate the vehicle 100 will be after a period of time. Depending on how the vehicle 100 is accelerated, braked and/or steered, the trajectories 108 have different lengths and end at different location coordinates. For example, a trajectory 108 with maximum deceleration, a trajectory 108 with a lane change, the reference trajectory 110 without steering intervention and braking intervention, a trajectory 108 with an evasive maneuver, and a trajectory 108 with a moderate braking intervention are shown here.

The trajectories 108 of the trajectory set 106 are rated in the device 102 with an effort value 112 each. Thus the trajectory 108 with the lane change is rated here exemplarily with an effort value 112 of −0.1. The trajectory 108 with the evasive maneuver is rated with an effort value 112 of −0.2, the reference trajectory 110 is rated with a reference effort value 114 of zero, and the trajectory 108 with the moderate brake intervention is rated with an effort value 112 of 0.7.

In an embodiment, trajectories with an effort value 112 greater than the reference effort value 114 are denominated alternative trajectories 116. Trajectories 108 with an effort value less than the reference effort value 114 are referred to as demand trajectories 118.

The device 102 sends a data packet 120 to the other vehicle 104. The data packet 120 contains information about trajectories 108 of the trajectory set 106. The respective effort values 112 are also transmitted via data packet 120.

In an embodiment, the data packet contains 120 information about the reference trajectory 110 and at least one further trajectory 108 of the trajectory set 106.

Figure 2:
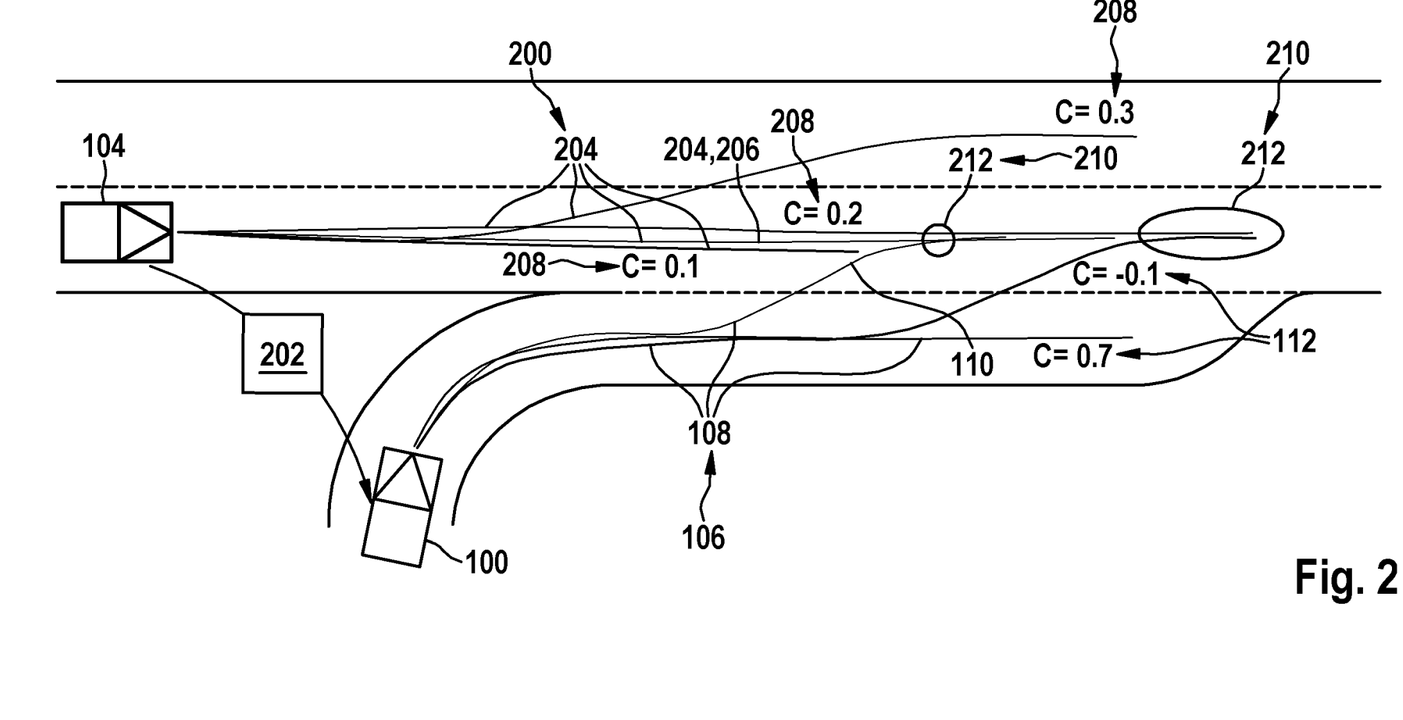
FIG. 2 shows a representation of a vehicle and a fellow vehicle with a trajectory set and a fellow trajectory set.

FIG. 2 shows a representation of a vehicle 100 and a fellow vehicle 104 with a trajectory set 106 and a fellow trajectory set 200. The trajectory set 106 is planned in such a way that the vehicle 100 will drive onto a multi-lane road via an access ramp. The reference trajectory 110 is planned in such a way that vehicle 100 will change to the right-hand lane of the road at about half of an acceleration lane of the access ramp. As other possibilities, trajectories 108 are planned, where the vehicle 100 stays longer on the acceleration lane and changes to the right-hand lane at a later point or brakes on the acceleration lane. The later change is rated with an effort value 112 of −0.1, the braking with 0.7.

The fellow vehicle 104 is already driving on the right-hand lane of the road. The vehicle 100 receives a fellow data packet 202 from the fellow vehicle 104 with information about the planned fellow trajectory set 200. For the fellow vehicle 104, a fellow trajectory 206 is planned as constant driving on the right-hand lane of the road. On alternative trajectories 204, the fellow vehicle 104 is accelerated or braked on the right-hand lane. On another trajectory 204, a lane change to the left-hand lane is planned. The fellow data packet 202 also contains fellow effort values 208 for the fellow trajectories 204. The lane change is rated with 0.3, the acceleration is rated with 0.2 and the braking is rated with 0.1.

In vehicle 100, the individual trajectories 108 of the trajectory set 106 are compared with the fellow reference trajectory 206 of the fellow trajectory set 200. For this purpose, tuples 210 are formed from one trajectory 108 and the fellow reference trajectory 206 each. In each tuple 210, a tuple effort value is determined from the respective effort value 112 and the respective fellow effort value 208. The tuples 210 are examined for collisions 212. It is recognized that the vehicle 100 cannot change from the acceleration lane to the road without a collision 212 with the current fellow reference trajectory 206, because the right-hand lane of the road is occupied by the fellow vehicle 104.

On the only collision-free trajectory 108, the vehicle 100 would be braked on the acceleration lane.

Figure 3:
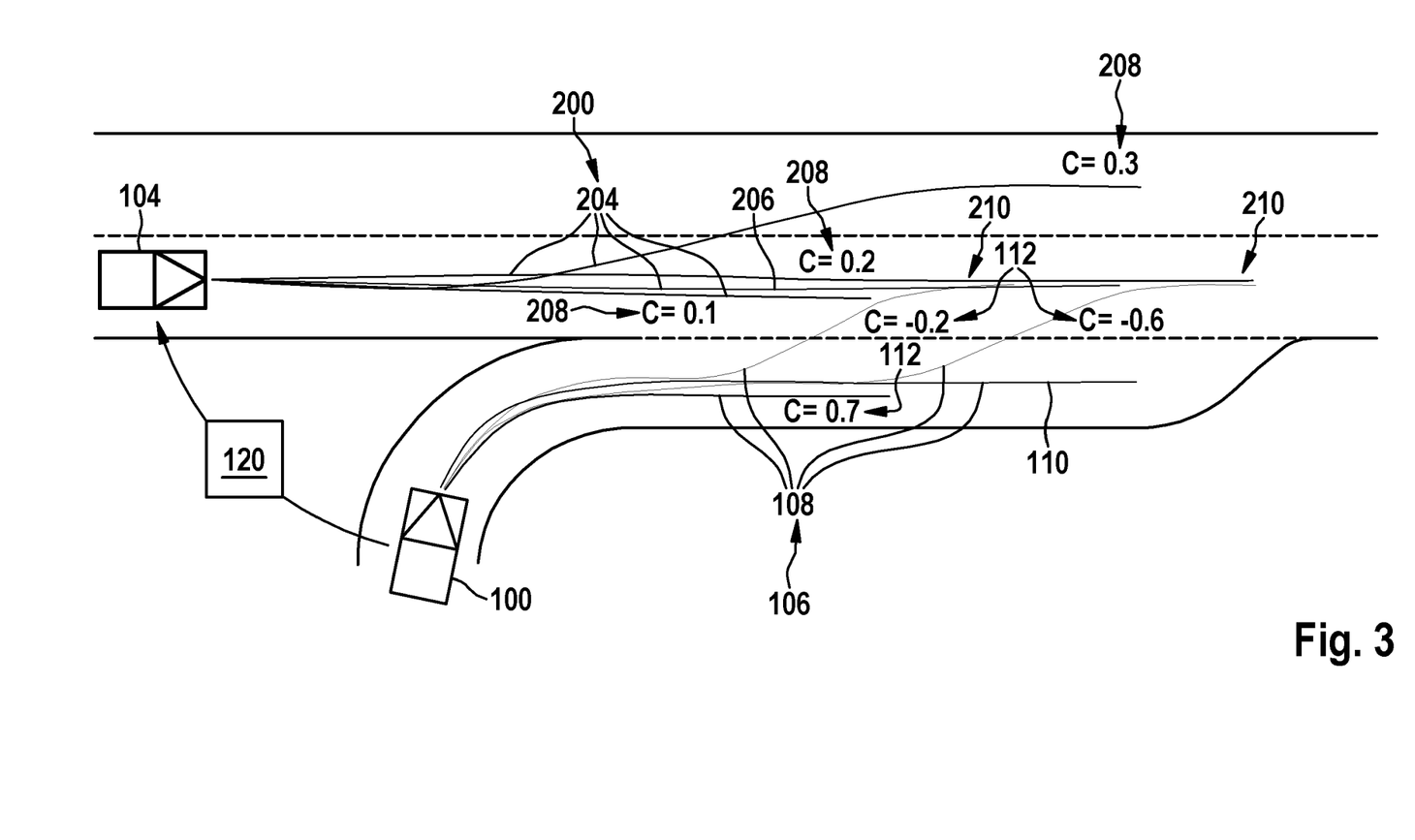
FIG. 3 shows a representation of a vehicle and a fellow vehicle with a trajectory set matched to the fellow trajectory set according to an embodiment.

FIG. 3 shows a representation of a vehicle 100 and a fellow vehicle 104 with a trajectory set 106 matched to the fellow trajectory set 200 according to an embodiment. The representation substantially corresponds to the representation in FIG. 2. Here, the vehicle 100 has selected the only collision-free trajectory 108 from the trajectories 108 as reference trajectory 110, has assigned the effort value zero thereto, and has rated the other trajectories 108 with new effort values 112. On the new reference trajectory 110, the vehicle 100 is now braked on the acceleration lane to let the fellow vehicle 104 pass on the right-hand lane. If several collision-free trajectories 108 had been available, that trajectory 108 would have been selected, which would have formed a tuple 210 with the lowest tuple effort value with a fellow trajectory 204.

The trajectory 108 with the early change to the right-hand lane is now rated with an effort value 112 of −0.2. The trajectory 108 with the later change is rated with −0.6. A new trajectory 108, on which the vehicle 100 would be braked even more strongly on the acceleration lane, is rated with an effort value of 0.7. The trajectories 108 and their associated new effort values 112 are sent to the fellow vehicle 104 in a data packet 120 as shown in FIG. 1.

In the fellow vehicle 104, tuples 210 are now formed from a fellow trajectory 204 and a trajectory 108 each, and the respective tuple effort value is determined from the associated fellow effort value 208 and the associated effort value 112. Collision-free tuples 210 are selected, and the tuple 210 with the lowest tuple effort value is chosen. Due to the previous re-determination of the effort values 112 in the vehicle 100, it becomes clear that the tuple 210 consisting of the trajectory 108 changing late to the right-hand lane and the fellow trajectory 204 with the slight deceleration is selected.

Figure 4:
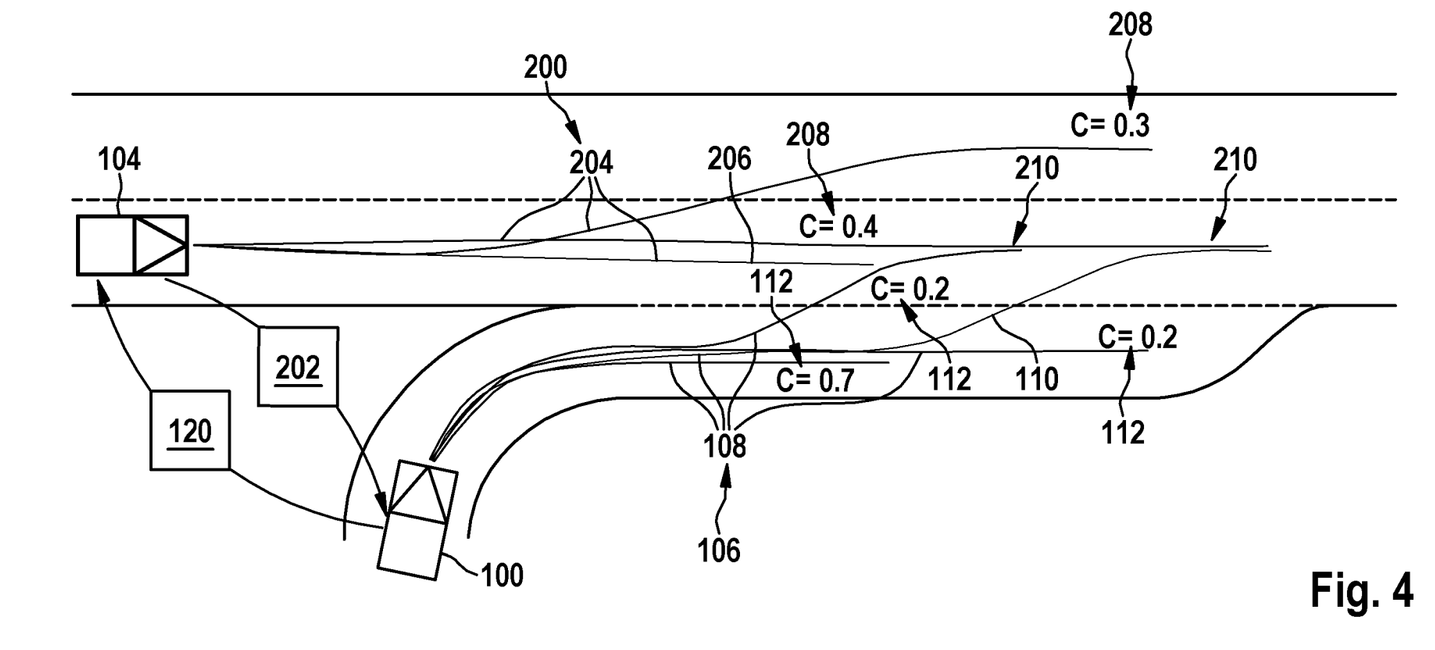
FIG. 4 shows a representation of a vehicle and a fellow vehicle with sets of trajectories matched to each other according to an embodiment.

FIG. 4 shows a representation of a vehicle 100 and a fellow vehicle 104 with trajectory sets 106, 200, which are matched to each other according to an embodiment. The representation substantially corresponds to the representations in FIGS. 2 and 3. Here, the fellow vehicle 104 has reacted to the changed reference trajectory 110 and the correspondingly changed effort values 112, selected the fellow trajectory 204 with the slight deceleration as the new fellow reference trajectory 206 and rated the remaining fellow trajectories 204 with new fellow effort values 208. The fellow trajectory 204 with the acceleration is now rated with a fellow effort value of 0.4, while the lane change is still rated with 0.3.

This information is transmitted to the vehicle 100 in a new fellow data packet 202. The same again forms tuples 210 and combines the effort values 112 and fellow effort values 208 into tuple effort values. Since several trajectories 108 are now collision-free towards the fellow reference trajectory 206, the tuple 210 with the lowest tuple effort value is selected and the trajectory 108 with the late lane change to the right-hand lane is selected as the new reference trajectory 110. The effort values 112 of the remaining trajectories 108 are re-determined accordingly. The early lane change is now rated with an effort value 112 of 0.2. The moderate deceleration on the acceleration lane is also rated with 0.2. The strong deceleration is still rated with 0.7. This information is again sent to the fellow vehicle 104 in a new data packet 120.

In other words, the approach presented here presents a decentralized coordination of cooperative driving maneuvers based on optional trajectories.

The approach presented here describes a method of cooperative maneuver coordination which is based on the exchange of trajectories. Here, information about the currently planned trajectory or reference trajectory and possible trajectories, e.g. for an evasive maneuver (alternative trajectories) or for an intended maneuver (demand trajectories) are transferred with associated effort ratings. This enables the participating vehicles to coordinate an optimal common maneuver (with the lowest total effort). Not always exactly one single desired trajectory is transferred, which increases the number of options in complex scenarios and improves the probability of a mutually profitable cooperation. The decision whether to enable a demand trajectory is not based on a global cost function that makes assumptions about the costs of other vehicles. Thus, for optimal decision making, no cost function that is the same among all vehicle manufacturers is required or else, error-prone assumptions may be dispensed with. Each vehicle calculates its own costs internally and transmits them to the other vehicles in a manner normalized to the interval [−1, 1]. Reference trajectories do not require an unconditional freedom from collision, since a virtual collision may also be caused by the fact that the prediction horizons (duration of the projection) of the considered trajectories do not match, for example if one of the cooperation partners uses an extremely short prediction horizon of <1 s. In this case, collisions of reference trajectories will rarely occur. At the other extreme, a very large prediction horizon will always lead to collisions, which would trigger a constant sending of demand trajectories. The "correct" prediction horizon depends on the situation.

With the approach presented here, cooperation does not require an active inquiry. Here, cooperation may be offered, by means of alternative trajectories, by a vehicle, which recognizes the future need for cooperation by another one already in advance, e.g. because it has a much more comprehensive environmental model thanks to its superior sensor technology.

Furthermore, it is possible to negotiate or optimize maneuver coordination. For example, the first vehicle could send a demand trajectory that obliges the second vehicle to reduce speed by 20 km/h if the second vehicle wants to cooperate. In the approach presented here, the second vehicle may communicate that a speed reduction of 10 km/h would be acceptable and it would then be ready to cooperate. Therein, a concrete change of the reference trajectory is not necessary, so that an immediate intervention in the vehicle control may be avoided. Thus, a non-binding continuous negotiation/optimization is achieved.

With the approach presented here, a purely informative transmitting of trajectories takes place. The decentralized cooperative maneuver coordination has two parts. Firstly, a protocol with a set of rules is presented, which allows vehicles to communicate. Secondly, methods are presented to perform different cooperative maneuver coordinations using this protocol. The basic principle is that vehicles exchange a trajectory set or an amount of trajectories or a cluster of trajectories. This amount consists of one "reference trajectory", 0 to n "alternative trajectories" and/or 0 to m "demand trajectories".

A "reference trajectory" is the trajectory that the vehicle currently follows and is implemented as a target parameter by the driving controller/driver. The "reference trajectory" is always communicated. An "alternative trajectory" describes a maneuver that is "more expensive" than the reference trajectory, but that the vehicle would be willing to drive if applicable. The "alternative trajectory" is communicated optionally. A "demand trajectory" describes a desired maneuver that the vehicle would like to drive due to lower "costs", but that the vehicle is currently not able to drive, e.g. because the required maneuver space is occupied by other vehicles. The "demand trajectory" is communicated optionally. The trajectories (reference trajectory, demand trajectory, alternative trajectory) are not explicitly coded by ID or marker. Rather, a cost value is transmitted for each trajectory in addition to the trajectories as such. This makes it possible to set each trajectory in relation to the other trajectories and to derive their meaning and priority therefrom. The transfer of the cost value for each trajectory allows other road users to determine a local approximation of the cost function of the transmitting vehicle. This is especially successful if the cost values and the associated trajectories are rated collectively over time.

Additionally, it is provided that for each trajectory, optionally a category may be specified. This category is helpful for the consideration of the trajectory in the maneuver planning in the fellow vehicles or other vehicles.

If the vehicle follows an "emergency trajectory", then it is in a technical (e.g. tire blowout) or situation-related emergency (e.g. child runs onto the road), i.e. it will not be able to adhere to normal traffic rules (e.g. stopping on a highway) or represents a potential hazard to other vehicles (due to heavy braking/steering).

A "cooperation offer" represents an offer to other vehicles to enable their demand trajectories. The vehicles concerned may be specified via an additional optional field by means of the V2X IDs of the addressed vehicles.

If a trajectory is marked with the category "Emergency Vehicle", the vehicle on this trajectory has special priority as it is on duty (for the vehicle as such, the information is already included in the CAM (Cooperative Awareness Message).

A category "Proposal" may be used, in conjunction with field of the V2X IDs, to send trajectories as maneuver proposals for specific other vehicles.

The concept includes trajectories with one cost value each and a possibility to classify and categorize the trajectories. The trajectories are classified as reference trajectory, demand trajectories and alternative trajectories. The alternative trajectories may be understood as cooperation offers. Reference trajectories may be collision-prone within a defined observation time. After expiration of the observation time, collision freedom is required. Alternative trajectories and demand trajectories are justified even if the reference trajectories of vehicles do not collide.

Thus, the vehicle may preventively/proactively communicate trajectories that it would be willing to drive, since the disadvantages are acceptable within its own cost function. It is possible to negotiate a cooperation before exerting influence on the respective vehicle. This provides the opportunity to efficiently optimize the maneuvers of the vehicles involved in a cooperation. Furthermore, there is the possibility of an extreme reduction of the computational requirements, since preferences of all cooperation partners are explicitly coded and communicated via effort values or costs, with the result that extensive cost analyses for fellow vehicles may be dispensed with. The transferred cost value increases the chance for a successful cooperation, because the costs of the cooperation partner may be estimated more precisely; if applicable, a local estimation of fellow costs may be omitted completely. The costs for one of the received fellow trajectories may also be estimated locally in the vehicle. If applicable, the received cost values of all fellow costs may be scaled. This allows a rough comparison of own and fellow costs with low computational effort. The introduction of categories results in a better support of maneuver planning algorithms.

A method of cooperative maneuver coordination between several vehicles is described, which is based on the periodic or event-based (i.e. when certain conditions are met) exchange of trajectory information between the vehicles. First the transmitted information is described. Then the coordination concept is described in different method variants.

First, rules for transmitting are defined for the different trajectories. The exchanged trajectory information, in the following described as the exchanged trajectory set or trajectory cluster, consists of the reference trajectory of the vehicle, a number M ($M>=0$) of demand trajectories, a number N ($N>=0$) of alternative trajectories and a relative cost value C ($-1<=C<=1$) for each transferred trajectory.

The reference trajectory is explicitly indicated, e.g. by the fact that it always comes first in the message. Alternatively or in addition, it may also be identified by an explicit marker. For each trajectory, a special categorization as cooperation offer/emergency trajectory/deployment trajectory/etc. may be transmitted. Each trajectory may be supplemented with a list of V2X IDs of other vehicles which the trajectory refers to with its categorization.

The category "Proposal" may be used to propose trajectories to fellow vehicles which they may then follow, e.g. in special situations such as forming a corridor for emergency vehicle access or avoiding obstacles.

The relative cost values of the trajectories are set as follows. The reference trajectory has a cost value $C0$ in the interval $-1<C0<1$. The demand trajectories have a cost value $C<C0$. The alternative trajectories have a cost value $C>C0$.

The reference trajectory is the trajectory that the vehicle is currently following and that is the target quantity for the driving controller/driver. Reference trajectories should be free of conflict in principle, but for limited periods of time or above a prediction horizon or above a time-to-collision (TTC) threshold, a conflict is possible. If conflicts occur, they are resolved in accordance with the StVO (Road Traffic Regulations). A conflict may be solved by the vehicle that is subordinate according to the StVO. Thus, the preferential vehicle may continue to send its conflicting trajectory.

An alternative trajectory is a trajectory which is of higher cost than the reference trajectory, but which the vehicle would still be willing to drive, if applicable. "If applicable" here means "under reserve", i.e. e.g. a driver's approval may be requested before an alternative trajectory may become the reference trajectory. Additionally, a rating of the overall situation may take place, wherein it is checked whether the own additional costs are offset by sufficient benefits for the other vehicles (from a local perspective). Optionally, the alternative trajectories may be planned in such a way that they do not conflict with all other reference trajectories.

A demand trajectory is a trajectory that better fulfills the desired destination and is therefore more favorable than the reference trajectory. The demand trajectory is in conflict with other trajectories. "Other trajectories" are to be understood as fellow reference trajectories. If these are too short, e.g. due to a different planning horizon, it is sufficient if the conflict occurs with the internal extrapolation of the reference trajectories.

The exchanged trajectories of a cluster of trajectories are not exclusively conceived as trajectories in Euclidean space, but may also be trajectories in other possible spaces. An example is the Frenet space along the lane centers, where a trajectory may consist of the indication of the respective lane as well as of the sections on the lane center over time. In this way, the cluster of trajectories may be efficiently transferred in a structured traffic space (=e.g. highway with lane markings).

In an embodiment, the vehicles involved use the messages on their environment, such as ego state or sensor information, exchanged independently of the cooperation. In this way, the trajectories of other road users may be additionally plausibilised, for example by classifying situations more clearly with the help of fellow sensor data.

In an embodiment, a coordination concept is applied using the cost values of the trajectories, based on a very similar cost function across vehicles. For the description of the coordination concept, an exemplary scenario is considered in which a first vehicle drives onto a road with right of way, on which a second vehicle is driving. The initial scenario is shown in FIG. 2, in which the second vehicle initially drives alone on the main lane. Since it has no need for a maneuver, it transmits in its trajectory cluster its reference trajectory and in this case three alternative trajectories. The alternative trajectories may be achieved by a slight braking (C=0.1), a slight acceleration (C=0.2) or a lane change (C=0.3). This means that the second vehicle would be more willing to slightly brake at the access ramp or to apply drag torque. The alternative maneuvers may each also be transmitted with the same cost value to approximate the cost functions. This makes it possible to recognize, for example, that deceleration at −0.5 m/s2 is just as expensive as acceleration at 1.0 m/s2 for the transmitting vehicle.

In its trajectory cluster, the first vehicle sends its reference trajectory with driving up at half of the acceleration lane, which includes a driving-up maneuver but cannot be performed because it collides with the reference trajectory of the second vehicle with right of way. This situation is due to an assumed transmission disturbance, because the first vehicle would have planned its reference trajectory differently if it had known the priority trajectory of the second vehicle. Furthermore, the first vehicle sends in its trajectory cluster a staying on the acceleration lane as an alternative trajectory and a driving up at the end of the acceleration lane as a demand trajectory.

Maneuver coordination takes advantage of the fact that vehicles are able to send demand and/or alternative trajectories. The following description of the coordination is made once from the point of view of the first vehicle requiring cooperation and once from the point of view of the second vehicle granting cooperation.

When cooperating from the point of view of the party requiring cooperation, the first vehicle determines, based on the trajectory cluster received from the second vehicle, that its reference trajectory, i.e. its current trajectory, as well as its demand trajectories are not feasible because they collide with the priority reference trajectory of the second vehicle. Due to the collision of the reference trajectories, the first vehicle recognizes that it is necessary to adjust its reference trajectory and therefore is in need of cooperation and that it is necessary to communicate this.

This process is carried out in two stages, wherein the second stage is only carried out if the first stage was not successful. This two-stage process allows the computational effort of the cooperation to be low if only the first stage is carried out. In both stages, the knowledge of the costs of fellow and ego trajectories is used to maximize the chances of a successful cooperation.

For fellow vehicles, the first stage of trajectory calculation uses only the trajectories received from these vehicles. The computation is executed in such a way that for the ego vehicle, a trajectory set is generated together with the associated cost values, whereby dynamic objects are ignored and only static constraints, such as lane boundaries, and static objects, such as broken down vehicles, are considered. The cost values may subsequently be normalized to the interval [−1; 1].

The computed trajectories are combined with one trajectory each of fellow vehicles to form tuples, i.e. a Cartesian product is formed of the computed and the received trajectories of other vehicles. Before that, the fellow trajectories are transformed to the current calculation time (so-called temporal alignment of the trajectories). For vehicles, for which no trajectory is available, e.g. because they are not sufficiently technically equipped, but which are recognized by the ego vehicle either via the on-board sensors or via information from fellow vehicles from V2V communication, the most probable trajectory is determined.

First, the reference trajectory of the ego vehicle is determined. For this purpose, tuples are sorted out in which collisions with the reference trajectories of the fellow vehicles occur in the area relevant for the planned maneuver. Here, a safety distance may be considered, which includes both the localization uncertainties of the involved vehicles and errors in the temporal alignment of the trajectories. From the remaining tuples, the tuple with the lowest sum of costs is selected, i.e. costs of the fellow trajectories combined with the costs of the ego trajectory. The combination may be designed in such a way that either an egoistic or an altruistic basic behavior is represented, depending on the driver. The ego trajectory from this tuple is taken over as the reference trajectory. The selected tuple and the new reference trajectory hence selected now act as a reference value (reference tuple).

Based on this, M suitable tuples (e.g., the lowest cost and/or considering a minimum distance to guarantee a sufficient diversity of the selected tuples) are selected from all tuples (including the collision-prone ones) with lower total costs (with a rather egoistic cost weighting of ego and fellow costs) than those of the reference tuple. The ego trajectories from these tuples are selected as "demand trajectories" for the new trajectory cluster to be transmitted.

From the tuples with higher total costs than those of the reference tuple, N tuples with the lowest (and/or considering a minimum distance between the tuples) costs are selected. The ego trajectories from these tuples are selected as "alternative trajectories" for the new trajectory cluster to be transmitted. Optionally, at least one alternative trajectory may be selected which is collision-free towards as many received fellow reference trajectories as possible so as to maximize the chance of the cooperation request being met.

The trajectory bundle representing the results of this selection is transmitted. For the scenario shown in FIG. 2, the solution is shown in FIG. 4.

The second stage of the trajectory calculation is performed if none of the tuples determined in the first stage is collision-free. Therein, for all equipped vehicles, sets of trajectories are calculated. For non-equipped vehicles, a most probable trajectory is determined. Then the costs of the trajectories calculated for the equipped vehicles are determined. For the own vehicle, the costs are calculated according to the own cost function and normalized to the interval [−1; 1]. For fellow vehicles, the costs of the calculated trajectories are calculated relative to the trajectories contained in the trajectory clusters received by these vehicles using a distance measure. In this way, an approximation of the cost function of the respective vehicle is used to rate the trajectories calculated for this vehicle.

Subsequently, the corresponding steps of the first stage are performed, and the resulting trajectory cluster is transmitted.

The described calculation process from the first stage and, if necessary, the second stage is carried out over several transmission cycles, if applicable, until the reference trajectory of the first vehicle no longer collides with the reference trajectories of other vehicles in the area relevant for the planned maneuver and may thus be driven. A possible solution for the considered scenario is shown in FIG. 4.

The coordination from the point of view of the granting second vehicle on the main lane also takes place in a two-stage process, wherein the second stage is only run through if the first stage does not produce a result. The calculation of the trajectories in the two stages is performed as described above. Before the calculation is carried out, it is checked whether there is a need for cooperation. The second vehicle may recognize the need for cooperation on the part of the first vehicle in individual cases by the fact that the reference trajectory of the first vehicle is not realizable in the relevant area, which may happen if the existence of another vehicle was not known to the sender at the time of planning due to shadowing. Therefore the second vehicle will internally consider another trajectory from the cluster of the first vehicle as its current trajectory. For this purpose, a demand trajectory or an alternative trajectory of the first vehicle is considered as its current trajectory, which has the lowest cost value and which does not collide with the current trajectory of the second vehicle within the collision horizon. In the considered example in FIG. 2, it is the alternative trajectory with the cost value C=0.7, because the demand trajectory also collides with the current trajectory of the second vehicle and thus continues to be listed as a demand trajectory within the second vehicle. In the subsequent calculation process to determine the trajectory cluster to be transmitted, the second vehicle adjusts its current trajectory, if necessary, so that the first vehicle may drive up. A possible solution is shown in FIG. 4.

For example, a vehicle that recognizes from its situation analysis that another car will, for example, drive up to the highway and will then need to cooperate, may already proactively offer cooperation. It does this by generating a suitable alternative trajectory and sending it (optionally also setting the category "cooperation offer"). The driving-up vehicle may then immediately generate and transmit a suitable demand trajectory. Thereupon, the vehicle on the main lane will adjust its reference trajectory. The more computationally efficient concept described here is based on the fact that vehicles permanently offer cooperation (to a greater or lesser extent).

In certain situations, it may be helpful to send trajectories as proposals to other vehicles. For example in the case of an emergency vehicle that wants a corridor for emergency vehicle access to be formed on the highway. Such suggestions may be useful for manually driven vehicles as a hint to the driver. Another possible use may occur in the case of a sudden emergency situation (avoiding an unexpected obstacle), if there is little time for coordination. Proposals may also be helpful in situations that are ambiguous, such as many vehicles simultaneously at a right-before-left crossroads. For this purpose, a vehicle calculates trajectories for other vehicles, marks them as "Proposal" and provides them with the V2X ID of the addressed vehicles. The proposal trajectories are attached to the maneuver cooperation message and transmitted. The cost values of the proposal trajectories are irrelevant in this case. The other vehicles receive the message and see that it contains a proposal for them. Within the scope of their usual trajectory determination, they evaluate the proposal for plausibility and give it preferential consideration if applicable. The advantage is that if there are possible alternative internal solutions, they will be proposed a variant that has been coordinated by a central location. The method described here thus enables central maneuver coordination.

With the approach presented here, an efficient optimization of cooperative maneuvers may be achieved. Instead of only one demand trajectory or only one alternative trajectory, each vehicle sends several variants of these trajectories. By means of the communicated cooperation costs, other vehicles are made aware of the preferences. A receiving vehicle may now directly select its preferred solution. In addition, it may in turn further determine and send a number of demand trajectories or alternative trajectories around its own solution.

Additional information regarding the technical background to the approach presented here may be found in the following sources:

Projekt IMAGinE—Intelligente Manöver Automatisierung—kooperative Gefahrenvermeidung in Echtzeit Werling et al., "Optimal trajectories for time-critical street scenarios using discretized terminal manifolds", The International Journal of Robotics Research, 2011

Düring et al., "Adaptive Cooperative Maneuver Planning Algorithm for Conflict Resolution in Diverse Traffic Situations", International Conference on Connected Vehicles and Expo, 2014

DE10 2016 209 330 A1

DE10 2012 011 994 A1

Finally, it should be noted that terms such as "having", "comprising", etc. do not exclude other elements or steps, and terms such as "a" or "one" do not exclude a multitude. Reference numerals in the claims are not to be considered as a limitation.

The invention claimed is:

1. A method performed by a processor of a vehicle for automated cooperatively coordinating future driving maneuvers of the vehicle with fellow maneuvers of at least one fellow vehicle, the method comprising the following steps:
   automatically rating a trajectory set of pre-planned trajectories for the vehicle with one effort value each using at least one rating criterion;
   automatically receiving a fellow data packet from the fellow vehicle, wherein the fellow data packet contains a fellow trajectory set with different pre-planned fellow trajectories for the fellow vehicle and a fellow effort value for each fellow trajectory;
   automatically combining one trajectory and one fellow trajectory each into tuples and combining the respective effort value with the respective fellow effort value into a tuple effort value of the tuple;
   automatically selecting collision-free tuples, wherein tuples are selected where the trajectory and the fellow trajectory are collision-free within a collision horizon;
   automatically selecting the collision-free tuple with the lowest tuple effort value and classifying the trajectory and the associated effort value of this tuple as reference trajectory and reference effort value;
   controlling the vehicle using the reference trajectory;
   automatically selecting trajectories having a lower effort value than the reference effort value and classifying these trajectories and associated effort values as demand trajectories and demand effort values, wherein a demand trajectory is an intended trajectory of the vehicle, with which a desired travel destination may be reached more favorably than with the reference trajectory;

automatically selecting trajectories having a higher effort value than the reference effort value and classifying these trajectories and associated effort values as alternative trajectories and alternative effort values, wherein an alternative trajectory is a trajectory indicating a cooperation offer of the vehicle that the vehicle might be willing to drive if applicable; and automatically transmitting a data packet to the fellow vehicle, wherein the data packet contains a trajectory set of the reference trajectory and the associated reference effort value and at least one trajectory from a group comprising the demand trajectories and the alternative trajectories as well as the corresponding effort values.

2. The method according to claim 1, wherein in the step of selecting, the collision horizon is situation dependent.

3. The method according to claim 1, wherein in the step of receiving, the fellow data packet further contains sensor data of the fellow vehicle, wherein at least one of
 in the step of selecting, the collision horizon is set using the sensor data or
 in the step of transmitting, the data packet further contains sensor data of the vehicle.

4. The method according to claim 1, wherein in the step of selecting, the collision-free tuples are selected using the road traffic regulations, wherein tuples whose trajectory has priority over the fellow trajectory are selected as collision-free tuples.

5. The method according to claim 1, wherein in the step of receiving, at least one further fellow data packet is received from a further fellow vehicle, wherein in the step of combining, a further fellow trajectory is added to the tuple, wherein the tuple effort value is supplemented with a further fellow effort value.

6. The method according to claim 1, wherein in the step of receiving, the fellow trajectory set further comprises a fellow reference trajectory of the fellow vehicle and a fellow reference effort value of the fellow reference trajectory, wherein in the step of combining, fellow reference tuples are combined from the fellow reference trajectory and one of the trajectories, wherein in the step of selecting, the trajectory of the collision-free fellow reference tuple with the lowest tuple effort value is selected as reference trajectory.

7. The method according to claim 1, wherein in the step of receiving, a category is received for at least one fellow trajectory, wherein in the step of selecting, the reference trajectory is further selected using the category.

8. The method according to claim 1, wherein in the step of selecting, the alternative trajectories are selected from tuples that are collision-free within the collision horizon.

9. The method according to claim 1, wherein in the step of combining, the fellow trajectory is predicted at least up to a prediction horizon of the vehicle if the fellow vehicle uses a shorter fellow prediction horizon.

10. The method according to claim 1, wherein in the step of combining, the fellow trajectories are transformed to a calculation time of the trajectories.

11. A device, wherein the device is adapted to at least one of execute, implement and control the method according to claim 1 in corresponding units.

12. A computer program product adapted to at least one of execute, implement and control the method according to claim 1.

13. A machine readable storage medium on which the computer program product according to claim 12 is stored.

* * * * *